(12) United States Patent
Büthker

(10) Patent No.: US 9,820,345 B2
(45) Date of Patent: Nov. 14, 2017

(54) LED CONTROLLER

(71) Applicant: NXP B.V., Eindhoven (NL)

(72) Inventor: Henricus Cornelis Johannes Büthker, Mierlo (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/270,902

(22) Filed: Sep. 20, 2016

(65) Prior Publication Data

US 2017/0086270 A1 Mar. 23, 2017

(30) Foreign Application Priority Data

Sep. 21, 2015 (EP) ..................................... 15186097

(51) Int. Cl.
*H05B 37/00* (2006.01)
*H05B 33/08* (2006.01)
*B60Q 1/14* (2006.01)

(52) U.S. Cl.
CPC ....... *H05B 33/0815* (2013.01); *B60Q 1/1415* (2013.01); *H05B 33/083* (2013.01); *H05B 33/0845* (2013.01)

(58) Field of Classification Search
CPC .............. H05B 37/029; H05B 33/0842; H05B 33/0845

See application file for complete search history.

(56) References Cited

U.S. PATENT DOCUMENTS

| | | | |
|---|---|---|---|
| 8,049,437 B2* | 11/2011 | Chang | H05B 37/0245 315/292 |
| 2003/0057890 A1 | 3/2003 | Lys et al. | |
| 2005/0111231 A1* | 5/2005 | Crodian | B60Q 1/1423 362/545 |
| 2011/0254445 A1 | 10/2011 | Bachhuber | |
| 2013/0063042 A1* | 3/2013 | Bora | H05B 33/0863 315/292 |
| 2013/0221872 A1 | 8/2013 | Gan et al. | |
| 2013/0313973 A1 | 11/2013 | DeNicholas et al. | |
| 2014/0239848 A1 | 8/2014 | Bradford | |

OTHER PUBLICATIONS

Extended European Search Report for Patent Appln. No. 15186097.0 (dated Jun. 30, 2016).

Texas Instruments; "TPS92661-Q1—High-Brightness LED Matrix Manager for Automotive Headlight Systems"; Product Datasheet; 53 pages (Sep. 2014).

* cited by examiner

*Primary Examiner* — Jason M Crawford
(74) *Attorney, Agent, or Firm* — Charlene R. Jacobsen

(57) ABSTRACT

An LED controller, for connecting to an LED string, comprising: an input terminal configured to receive a light-control-signal representative of a received-profile-identifier; a local memory configured to store a plurality of profile-data, wherein each of the plurality of profile-data defines an association between a plurality of light-values and a plurality of sequence-numbers; a processor configured to: determine one of the plurality of profile-data as selected-profile-data in accordance with the received-profile identifier; and determine a set of LED control signals for the LED string in accordance with light-values of the selected-profile-data for a set of sequence-numbers.

15 Claims, 5 Drawing Sheets

LED CONTROLLER

CROSS-REFERENCE TO RELATED APPLICATIONS

This application claims the priority under 35 U.S.C. §119 of European Patent Application No. 15186097.0, filed Sep. 21, 2015, the contents of which are incorporated by reference herein.

The present disclosure relates to LED controllers, and in particular, although not exclusively, to LED controllers for controlling a dimming level of a plurality of LEDs.

According to a first aspect of the present disclosure there is provided an LED controller, for connecting to an LED string, comprising:
an input terminal configured to receive a light-control-signal representative of a received-profile-identifier;
a local memory configured to store a plurality of profile-data, wherein each of the plurality of profile-data defines an association between a plurality of light-values and a plurality of sequence-numbers;
a processor configured to:
determine one of the plurality of profile-data as selected-profile-data in accordance with the received-profile identifier; and
determine a set of LED control signals for the LED string in accordance with light-values of the selected-profile-data for a set of sequence-numbers.

In one or more embodiments the LED controller is provided on an integrated circuit, and wherein the local memory and the processor are provided on the same integrated circuit.

In one or more embodiments each of the plurality of profile-data comprises coefficient values for a polynomial that defines the light-value as a function of the sequence-number. The processor may be configured to determine the set of LED control signals in accordance with the polynomial, the coefficient values and the set of sequence numbers. The polynomial may be up to and including a 3rd order polynomial.

In one or more embodiments the processor is configured to:
apply the polynomial to the set of sequence-numbers, using the coefficient values represented by the selected-profile-data, in order to determine a set of associated light-values; and
determine the set of LED control signals in accordance with the determined set of associated light-values.

In one or more embodiments the set of sequence-numbers comprises a start-sequence-number and one or more subsequent-sequence-numbers, and
the processor is configured to:
apply the polynomial, using the coefficient values represented by the selected-profile-data, to the start-sequence-number in order to determine a start-light-value; and
for each of the plurality of subsequent-sequence-numbers, determine a difference-light-value and add the difference-light-value to a preceding-light-value in order to determine a subsequent-light-value; and
determine the set of LED control signals for the LED string in accordance with the start-light-value and each subsequent-light-value.

In one or more embodiments the processor is configured to apply a differentiated version of the polynomial with the coefficient values represented by the selected-profile-data to each subsequent-sequence-number in order to determine the difference-light-value.

In one or more embodiments each of the plurality of profile-data comprises a plurality of light-values and their associated sequence-numbers.

In one or more embodiments the set of sequence-numbers is a subset of the plurality of the sequence-numbers of the selected-profile-data.

In one or more embodiments the input terminal is configured to receive a start-position-indicator representative of a start-sequence-number. The processor may be configured to determine the set of LED control signals for the LED string in accordance with light-values of the selected-profile-data for a set of sequence-numbers staring from the start-sequence-number. The start-sequence-number may be an intermediate value in the sequence-numbers of the selected-profile-data.

The light-control-signal may also be representative of a stop-position-indicator representative of an end-sequence-number. The processor may be configured to determine the set of LED control signals for the LED string in accordance with light-values of the selected-profile-data for a set of sequence-numbers ending with the stop-sequence-number. The stop-sequence-number may be an intermediate value in the sequence-numbers of the selected-profile-data.

In one or more embodiments the light-control-signal is also representative of a profile-direction-indicator. The processor may be configured to determine the set of LED control signals for the LED string in accordance with light-values of the selected-profile-data for the set of sequence-numbers in either a forward or reverse direction according to the profile-direction-indicator.

In one or more embodiments the light-control-signal is also representative of a shift-value. The processor may be configured to control the speed with which the set of sequence numbers of the selected-profile-data are changed when determining the set of LED control signals in accordance with the shift-value.

In one or more embodiments the light-control-signal is also representative of an auto-indicator. The processor may be configured to automatically stitch a plurality of light-change-profiles together in accordance with the auto-indicator.

In one or more embodiments the LED controller further comprises two output terminals for each LED in the LED string; and a switch connected between the two output terminals for each LED. The switch may be configured to receive one of the set of LED control signals, such that the switch is opened and closed in accordance with the received LED control signal in order to selectively short circuit an associated LED.

The set of PWM LED control signals may comprise a set of time-varying signals for opening and closing switches in order to selectively short circuit LEDs in the LED string. The set of LED control signals may comprise a separate LED control signal for each LED in the LED string.

In one or more embodiments the set of LED control signals comprises a set of PWM LED control signals. The processor may be configured to set the width of pulses in the set of PWM LED control signals in accordance with the light-values of the selected-profile-data.

According to a further aspect of the present disclosure there is provided a method of operating an LED matrix system comprising:
receiving a light-control-signal representative of a received-profile-identifier;

determining one of a plurality of profile-data as selected-profile-data in accordance with the received-profile identifier, wherein each of the plurality of profile-data is stored in local memory and defines an association between a plurality of light-values and a plurality of sequence-numbers; and determining a set of LED control signals for the LED string in accordance with light-values of the selected-profile-data for a set of sequence-numbers.

There may be provided an integrated circuit, an LED matrix system or an electronic device that comprises any LED controller disclosed herein, or is configured to perform any method disclosed herein.

There may be provided a computer program, which when run on a computer, causes the computer to configure any apparatus, including a circuit, controller, system, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

Figure 1:
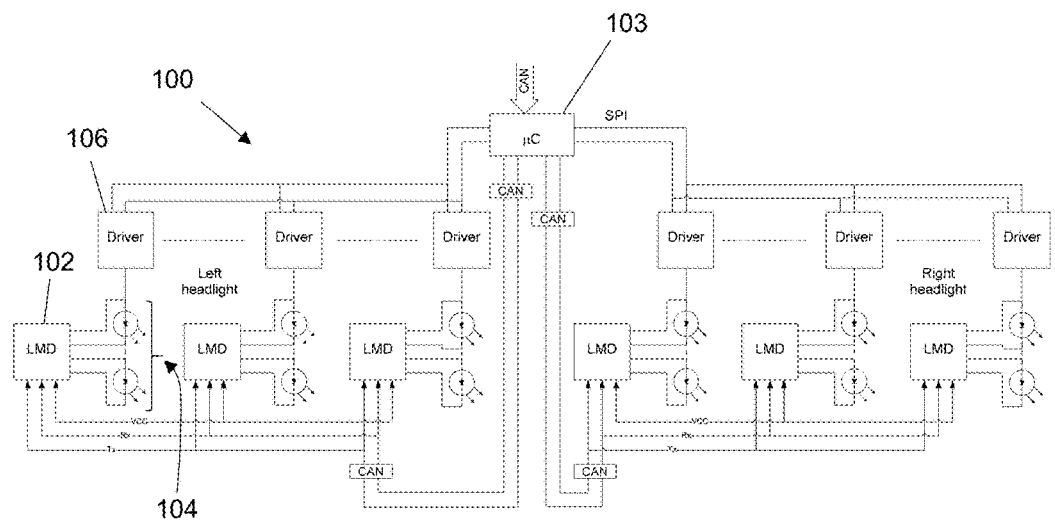
FIG. 1 shows an example LED matrix system.

to FIG. 1 shows an example LED matrix system 100. The LED matrix system 100 in this example is for a headlight system of an automobile. Each headlight can contain multiple LED matrix drivers (LMDs) 102 that share a communication bus with a central controlling microcontroller 103. In the example of FIG. 1, the communication bus is a controller area network (CAN) bus. The LEDs 104 in the headlights are connected in series in strings of up to 12. This limits the maximum string voltage to safe values, below 60 V in this example. The current through an LED string 104 is provided by a matrix beam driver 106, which can be a DC-DC converter.

In one example, the LED matrix drivers (LMDs) 102 have 12 channels and a PWM resolution of 10 to 12 bits. A plurality of these LMDs 102 can be connected to the same communication bus. The central microcontroller 103 transmits PWM settings for each channel and each LMD 102 over the CAN bus.

Figure 3:
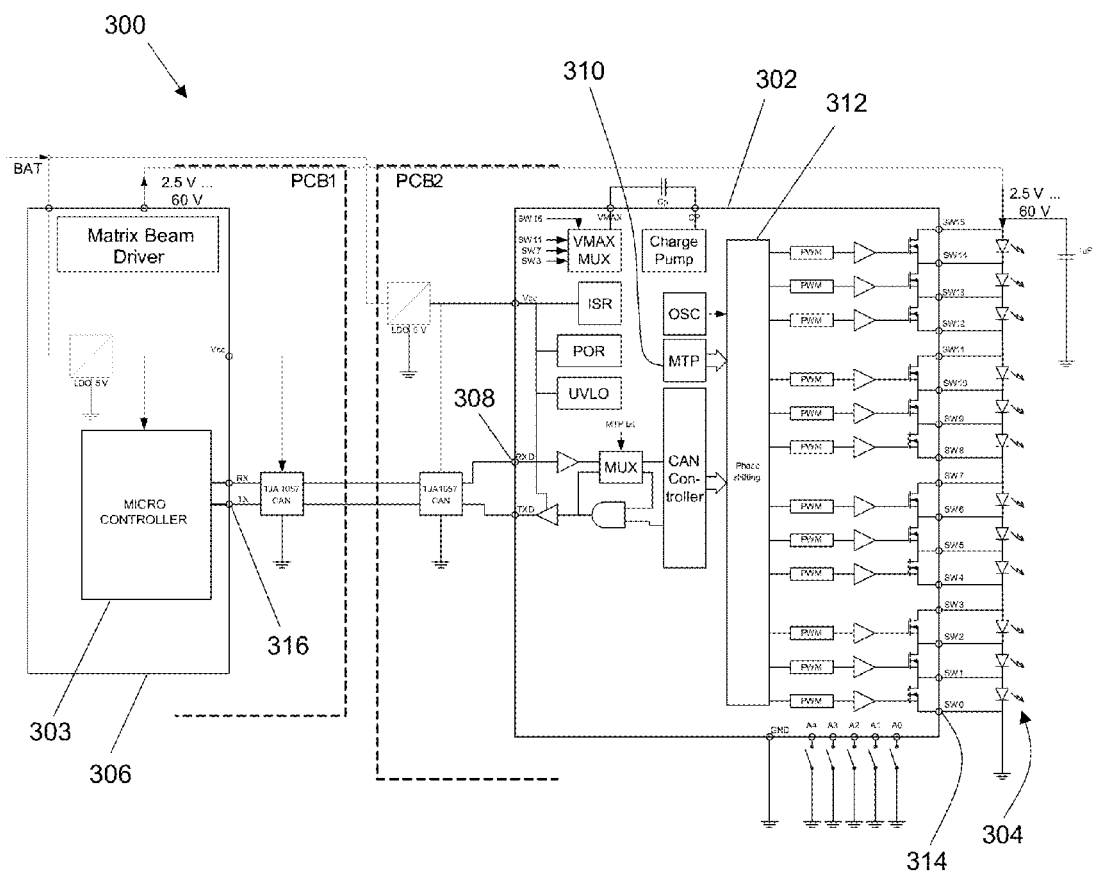
FIG. 3 shows part of an example embodiment of an LED matrix system.

In order to control individual LEDs, a switch (not shown in FIG. 1) is placed in parallel with each LED 104. This switch can be an NMOS FET, as shown in FIG. 3. By closing the switch with a certain duty-cycle and (high) frequency, the average current through the LED 104 can be reduced and the LED can be dimmed. In modern and future automotive lighting systems, large numbers of LEDs 104 may be used, in some applications more than 300 LEDs 104 may be used. If one LED Matrix Driver (LMD) can drive 12 LEDs, then 32 devices can drive 384 LEDs.

The LEDs 102 may need to be capable of being dimmed, in some examples in order to conform to a certain dimming curve. The duration of the dimming curve can be up to 5 seconds.

When such a large number of LEDs 104 is used, a suitably high bandwidth of the communication bus can be difficult to achieve. As an example, a required bandwidth of 921.6 kbit/sec is necessary for the following application:

PWM frequency: 200 Hz
Number of LEDs per string: 12
Number of strings or LMDs: 32
PWM resolution: 12 bit
Required bandwidth: 200*12*32*12=921.6 kbit/sec.

For a 400 Hz PWM update rate, the required bandwidth doubles to 1.843 Mbit/sec.

Furthermore, the above calculations relate to the basic data rate, without address bits and error reduction bits. The real required data rate may be three times larger than the basic data rate. The maximum data rate of an automotive qualified CAN interface is 500 kbit/sec. Therefore, it may not be possible to implement the above example with such a CAN interface.

For another example of 10 bit PWM and 8 devices on a single bus, the maximum data rate then becomes 192 kbit/sec. This can just be achieved with a 500 kbit/sec CAN interface. However, there can be a desire for 12 bit resolution and more than 96 LEDs.

One or more of the example embodiments disclosed herein use an internal/local memory to store PWM dimming curves/profiles on-chip. The communication interface then only needs to transmit the ID of the desired curve, and optionally its start and stop position. After starting execution, subsequent PWM values can be read from memory or calculated using on-chip stored coefficients. A curve can contain up to 256 values, so with only a few bytes, a sequence of 256 12 bit PWM values can be defined.

The LED matrix driver (LMD) 102 is a relatively new component. It can be a power device, and such devices may not usually have a lot of digital content. However, examples disclosed herein incorporate more digital circuitry and memory on power devices such as an LMD 102. In some embodiments, the LMD 102 has an internal memory.

Figure 2:
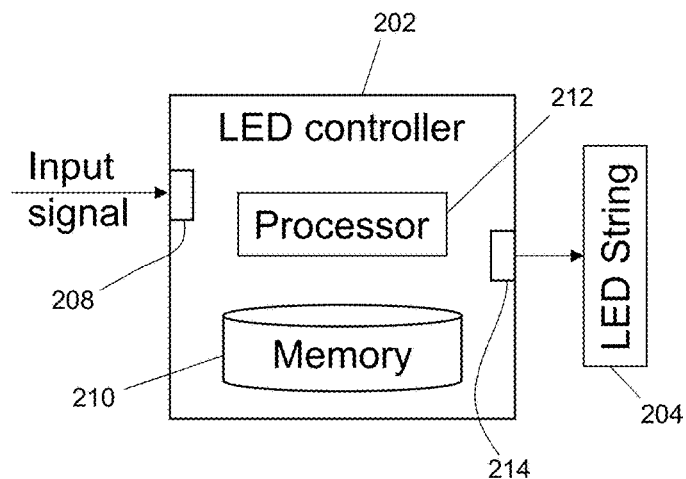
FIG. 2 shows an example embodiment of an LED controller.

FIG. 2 shows an example embodiment of an LED controller 202, which can provide similar functionality to the LED matrix drivers (LMDs) of FIG. 1. The LED controller 202 is for connecting to an LED string 204 that can comprise one or more LEDs. As will be discussed in more detail below, the LED controller 202 can provide a set of LED control signals to the LED string 204 such that they provide a desired light output. The set of LED control signals can include a separate LED control signal for each LED in the LED string.

The LED controller 202 includes a local memory 210 that stores a plurality of profile-data. The memory 310 may be consider "local" in that it can provided on the same integrated circuit (IC) as the processor 312. Alternatively, the memory 310 may be provided on the same printed circuit board (PCB) as the processor 312, and a local I2C bus can be used to communicate information between the memory 310 and the processor 312.

Each of the plurality of profile-data defines an association between a plurality of light-values and a plurality of sequence-numbers. The profile-data may comprise coefficients for a polynomial that defines the association, or may comprise a database or look-up-table that contains the plurality of light-values and their associated sequence-numbers.

The LED controller 202 also includes an input terminal 208 configured to receive a light-control-signal representative of a received-profile-identifier.

The LED controller 202 also includes a processor 212 configured to determine one of the plurality of profile data that is stored in the local memory 210 as "selected-profile-data" in accordance with the received-profile identifier. The processor 212 can then determine a set of LED control signals for the LED string 204 in accordance with light-values of the selected-profile-data for a set of sequence-numbers. As will be discussed below, the set of sequence-numbers may all of the plurality of sequence-numbers such that they are sequentially applied from the start of the sequence. Alternatively, the set of sequence-numbers may be a subset of the plurality of sequence-numbers, such that they are applied starting from a start position that is intermediate of a start-sequence-number and/or ending at an intermediate end-sequence-number.

In one example, the LED control signals are pulse width modulated (PWM) signals that will control the (time-averaged) brightness of each LED in the LED string 204 by setting a proportion of a switching-period during which the LED is on.

The LED controller 202 includes one or more output terminals 214 for connecting to the LED string 204, as will be discussed below with reference to FIG. 3.

FIG. 3 shows part of an example embodiment of an LED matrix system 300. The LED matrix system 300 includes an LED controller 302, which may also be referred to as an LED matrix driver (LMD), a matrix beam driver 306, and a LED string 304. The matrix beam driver 306 provides power to the LED string 304.

In this example, the matrix beam driver 306 is shown as also providing the functionality of a microcontroller 303, which can also be referred to as a central controlling microcontroller. In other examples, the matrix beam driver 306 and the microcontroller 303 can be provided as separate components. The microcontroller 303 includes an output terminal 316 for providing a light-control-signal to the LED controller 302. In an automobile example, the microcontroller 303 may receive a manually or automatically generated light-control-signal indicative of a required change to the light output by the headlights—for example to turn the headlights on or off, or to switch between a main and a dipped beam. In order to achieve such a change of light output, the microcontroller 303 may identify one of a plurality of light-change-profiles that should be applied to a current light level in order to result in a desired light level. Each of these light-change-profiles can have a profile-identifier. Each of the possible light-change-profiles may be associated with at least one of the profile-identifiers—in some examples a plurality of light-change-profiles may be applied sequentially in order to achieve the desired light level. The light-control-signal that is provided at the output terminal of the microcontroller 303 may be representative of one or more profile-identifiers.

The LED controller 302 includes an input terminal 308 for receiving the light-control-signal from the microcontroller 303. In this example, the light-control-signal is transmitted from the microcontroller 303 to the LED controller 302 using a CAN bus, although it will be appreciated that other networks and protocols can be used. The LED controller 302 has an external interface, which in this automotive example is a CAN interface.

The light-control-signal (or at least information that is represented by the light-control-signal) is provided to a processor 312 of the LED controller 302, which in this example is labelled as a phase shifting processor. The processor 302 has access to local memory 310, which in this example is internal reprogrammable memory (MTP, Multiple Times Programmable).

The local memory 310 stores a plurality of profile-data that each define an association between a plurality of light-values and a plurality of sequence-numbers. This association may be considered as defining a light-change-profile. The profile-data may also be referred to as curve information because association between the plurality of light-values and the plurality of sequence-numbers can be represented as a curve.

The processor 312 can determine one of the plurality of profile-data as a selected-profile-data in accordance with the received-profile identifier, and then determine a set of LED control signals for the LED string 304 in accordance with light-values of the selected-profile-data.

An advantage of storing the profile-data locally on the LED controller 302 is that a much smaller amount of data needs to be communicated between the microcontroller 303 and the LED controller 302 over the CAN bus in order for a desired lighting-change-profile to be implemented. This results in a dramatically reduced data rate when compared with a system that transmits a required PWM value for each individual LED.

In this example, the LED string 304 includes 12 LEDs, which are implemented as four sub-strings of 3 LEDs. Each sub-string of LEDs is connected to four output terminals 314 of the LED controller 302, such that the anode and cathode of each LED is connected to a different output terminal 314 of the LED controller 302. The output terminal that is connected to the anode of an LED can also be connected to the cathode of another LED.

As shown in FIG. 3, in this example the LED controller 302 includes a switch between two adjacent output terminals 314 such that a switch is provided in parallel with each LED.

A control terminal of each switch is connected to the processor 312, such that the processor 312 can provide an LED control signal to each of the switches in order to control at what times, and for how long, the associated LED is short-circuited. That is, the switch can be opened and closed in accordance with the received LED control signal in order to selectively short circuit an associated LED. In this way, the perceived brightness of each LED, over time, can be controlled.

In PWM examples, the PWM LED control signals comprise a set of time-varying signals for opening and closing switches. A width of pulses in the set of PWM LED control signals can be set in accordance with the light-values of the selected-profile-data.

Figure 4A:
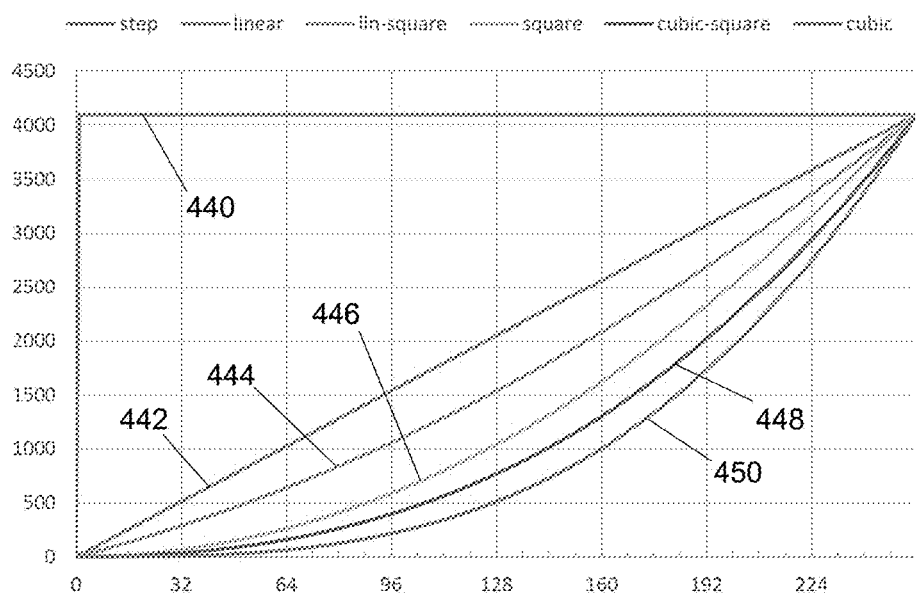
FIGS. 4a and 4b show six non-limiting examples of dimming curves.

FIG. 4a shows six non-limiting examples of dimming curves that can be represented by profile data stored in the local memory of the LED controllers of FIGS. 2 and 3.

The vertical axis of FIG. 4a represents light intensity. In this example, a 12 bit resolution is used such that the maximum value is 4096. So, from 0% light to 100% light is from 0 to 4096 on the vertical axis.

The horizontal axis represents the sequence number. It starts with 0 and ends with 255 in this example. With a 200 Hz PWM frequency, a new value from the curve is used every 5 ms, and after 1.28 seconds the whole curve has finished. With a 400 Hz PWM frequency, the 256 values are finished in 0.64 seconds.

The example dimming curves shown in FIG. 4a are:
- a step function 440, which can also be referred to as immediately ON;
- a linear function 442, which can have a constant increase of duty-cycle;
- a linear-square function 444;
- a square function 446;
- a cubic-square function 448; and
- a cubic function 450.

It will be appreciated that any curve is possible if all the sequence number/light intensity values are stored in the local memory. Storing a curve in the local memory as profile data that includes each of its light intensity/sequence number pairs of values requires 12 bit*256=3072 bits per curve. Storing 8 curves would require 24576 bits or 3 kB. In some applications, storing curves in this way may require a relatively large amount of memory.

In another example, any type of polynomial can be used to describe a dimming curve, and corresponding coefficients for the polynomial can be stored in the local memory.

Figure 4B:
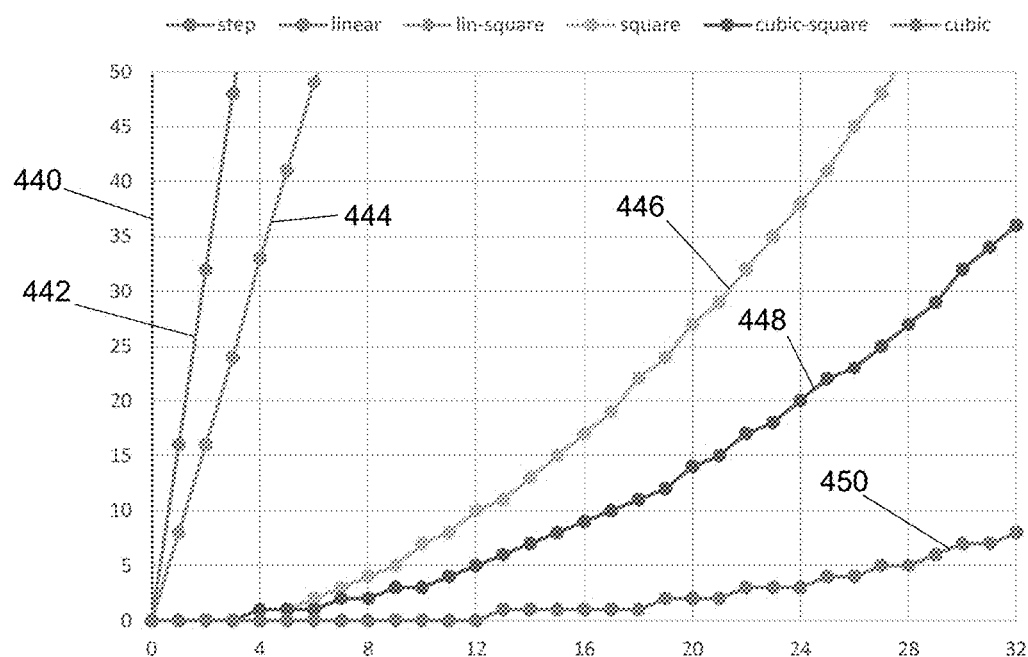

FIG. 4b shows a zoomed-in view of the curves of FIG. 4a.

FIG. 4b shows that the linear function 442 does not require the 12 bit resolution because the steps are 16 units large. The square function 446 makes good use of the 12 bits, whereas the pure cubic function 450 would even need more than 12 bits to be accurately represented.

In one example, therefore, it can be considered acceptable to assume that if a polynomial is used to describe a dimming curve, the polynomial may be up to and including a 3rd order polynomial. This is because any higher order polynomials will not necessarily provide a different lighting profile for a system with 12 bit resolution. Therefore, a generic equation for a dimming curve can be written as:

$$PWM(x)=ax^3+bx^2+cx+d.$$

A digital implementation of this equation would involve 6 multiplications.

Figure 5:
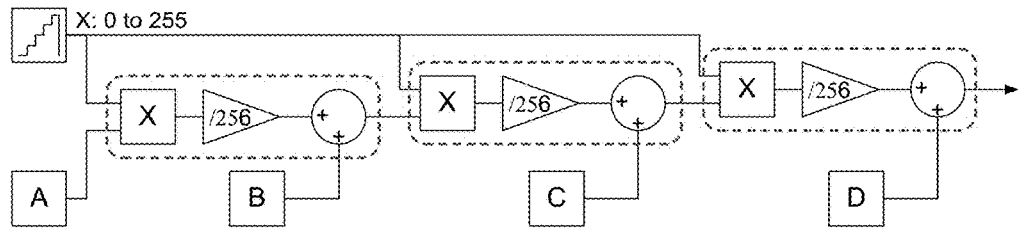
FIG. 5 illustrates an example implementation of a cubic equation that uses a recursive notation.

FIG. 5 illustrates an example implementation of a cubic equation that uses a recursive notation. Such a recursive notation is simpler than a digital implementation because it only involves 3 multiplications:

$$PWM(x)=((ax+b)x+c)x+d.$$

In this implementation, the definition of a curve requires storing 4 coefficients in local memory, each 12 bit wide. For a complete curve that is 48 bits or 6 bytes. 8 Curves stored in this way will require 48 bytes instead of 3 kByte, which is a significant reduction by a factor 64.

In this way, each of the plurality of profile-data comprises coefficient values for a polynomial that defines the light-value as a function of the sequence-number, such that the processor of the LED controller can determine the set of LED control signals in accordance with the polynomial, the coefficient values and the set of sequence numbers.

The implementation of FIG. 5 may be referred to as an absolute PWM calculation, and can be considered as applying Horner's rule.

In some applications, a potential advantage of storing the sequence number/light intensity values in the local memory (as opposed to coefficients for a polynomial), is that a relatively large number of shorter curves can conveniently be stored in one block of memory. This is because the amount of memory required for the curve depends upon the length of the curve. In contrast, when a curve is defined using polynomials, it may not be possible to store as many curves in local memory because the amount of memory required depends upon the number of different curves, and not the length of each curve that is expected to be used.

The communication data rate required for both complete curves and polynomial coefficients can be equal, and can require communication of at least a profile-identifier/curve ID as part of the light-control-signal in order to completely describe the PWM sequences over 1.28 s. In such examples, 3 bytes of data can be communicated in order to define a curve of 256 positions, whereas 384 bytes would be needed for direct PWM programming. The reduction in required data transfer/bandwidth is very significant and is theoretically more than 100.

Figure 6A:
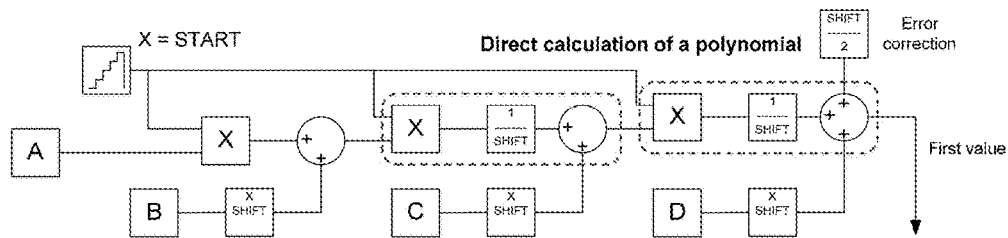
FIGS. 6a and 6b illustrates an example implementation for calculating a first value and then subsequent increments of a cubic equation.
Figure 6B:
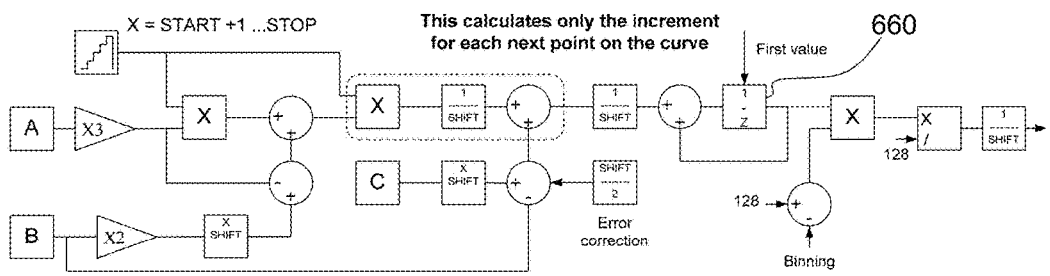

FIGS. 6a and 6b illustrate an example implementation for calculating a first value and then subsequent increments of a cubic equation. The implementation includes a memory element 660. The implementation of FIGS. 6a and 6b may be referred to as an incremental PWM calculation. As will be described with reference to FIG. 7, use of an incremental PWM calculation can reduce or prevent jumps in the calculated PWM values.

In the incremental PWM calculation implementation, the set of sequence-numbers can be considered as comprising a start-sequence-number and one or more subsequent-sequence-numbers. As shown in FIG. 6a, the processor can then apply the polynomial, using the coefficient values represented by the selected-profile-data, to the start-sequence-number in order to determine a start-light-value (identified as a "first value" in FIG. 6a).

The incremental PWM calculation implementation then calculates the difference between consecutive points, which can be calculated using the derivative of the polynomial. Two ways to find the derivative include:

$$Delta\_PWM(x)=A(3x^2+3x+1)+B(2x+1)+C\text{1st) discrete differentiation.}$$

$$Delta\_PWM(x)=3Ax^2+2Bx+C \quad \text{2nd) continuous differentiation.}$$

So, for each of the plurality of subsequent-sequence-numbers, the processor can determine a difference-light-value and add the difference-light-value to a preceding-lightvalue in order to determine a subsequent-light-value. FIG. 6b illustrates one example implementation for performing this processing.

The processor can then determine the set of LED control signals for the LED string in accordance with the start-light-value and each subsequent-light-value. As discussed above, the processor can apply a differentiated version of the polynomial with the coefficient values represented by the selected-profile-data to each subsequent-sequence-number in order to determine the difference-light-value.

In this example, as an optional feature, all coefficients are first multiplied with the SHIFT value and in the final stage divided again. This can provide for good accuracy because the calculation is then performed with 8 bits more. As a further optional feature, an extra binning factor is used, which involves multiplying with a number <128 and dividing by 128.

The memory element 660 shown in FIG. 6 has D (from the polynomial identified above) as an initial value.

Figure 7:
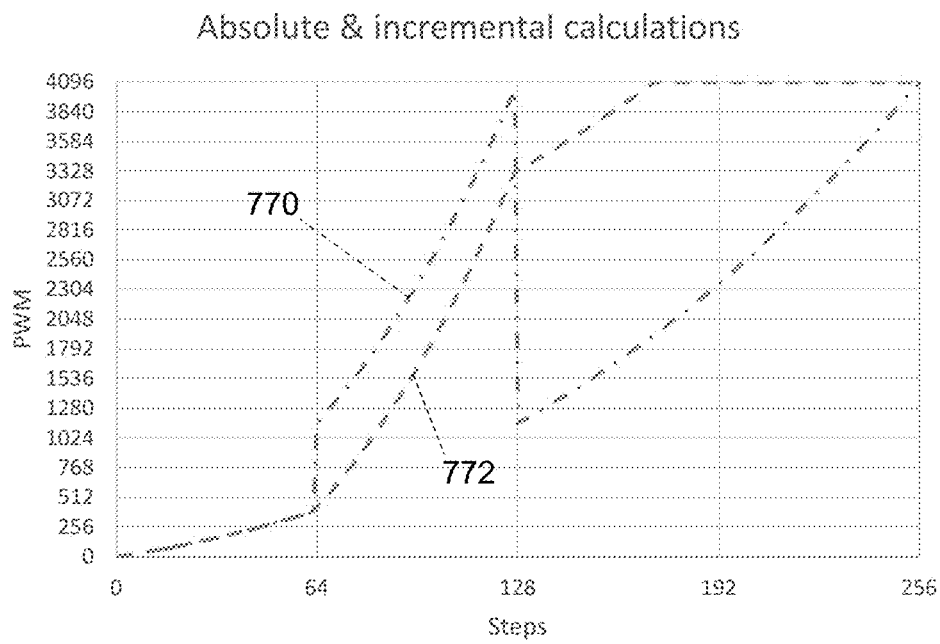
FIG. 7 shows a plot that identifies the difference between PWM values that are determined for absolute and incremental PWM calculations.

FIG. 7 shows a plot that identifies the difference between PWM values that are determined for absolute and incremental PWM calculations when a shift-value is initially set to 256, and changed to 128 from positions 64 to 128. As discussed above, the shift-to value defines how many sequence numbers are used to define a curve between a start-light-intensity-value and an end-light-intensity-value. Therefore, changing the shift-value from 256 to 128 makes the curve go twice as fast.

The absolute-calculation-profile is shown in FIG. 7 with reference 770, and the incremental-calculation-profile is shown with reference 772. The absolute-calculation-profile 770 shows a clear discontinuity when the shift-value is changed. The incremental-calculation-profile 772 advantageously shows a smooth curve. In this example, no complex calculations are required to keep the curves smooth. Indeed, the incremental calculation is even less complex than the absolute calculation.

For examples where the profile-data is provided as coefficient values for a polynomial, the processor can apply the polynomial to the set of sequence-numbers, using the coefficient values represented by the selected-profile-data, in order to determine a set of associated light-values, and then determine the set of LED control signals in accordance with the determined set of associated light-values.

Optionally, the light-control-signal can also be representative of one or more of the following:
  A start-position-indicator that is representative of a start-sequence-number, and can define an intermediate sequence number (between a start-sequence-number (which may be 0) and an end-sequence-number (which may be 255)) of the selected-profile-data that should be used as the first sequence number in the profile-data a light-change-profile for determining the set of LED control signals. That is, the processor can determine the set of LED control signals for the LED string in accordance with light-values of the selected-profile-data for a set of sequence-numbers starting from the start-sequence-number.
  A stop-position-indicator that is representative of an end-sequence-number, and can define an intermediate sequence number (between a start-sequence-number (which may be 0) and an end-sequence-number (which may be 255)) of the selected-profile-data that should be used as the last sequence number in the profile-data for determining the set of LED control signals. That is, the processor can determine the set of LED control signals for the LED string in accordance with light-values of the selected-profile-data for a set of sequence-numbers ending with the stop-sequence-number.
  A shift-value that defines how quickly the curve/profile data should be applied. The shift-value can be used by the processor to control the speed with which the set of sequence numbers of the selected-profile-data are changed when determining the set of LED control signals—for example, if a total of 256 sequence numbers are available, and the shift-value is set to 128, then two sequence numbers are applied for each PWM period such that the curve is completed twice as quickly. Similarly, the shift-value can be used to decelerate the curve—for example, if a total of 256 sequence numbers are available, and the shift-value is set to 512, then the sequence number is implemented for every other PWM period such that the curve is completed twice as slowly.
  An auto-indicator, which may be a flag or single bit that defines whether or not the processor should automatically apply a subsequent light-change-profile after a current light-change-profile has been applied. By setting this flag, the processor can automatically stitch a plurality of light-change-profiles together.
  A subsequent-profile-identifier, which is used by the processor to determine which of the plurality of profile-data is used to automatically generate a second set of LED control signals, to be stitched to the end of the set of LED control signals determined in accordance with the selected-profile-data. The processor can store the second set of LED control signals in a shadow register in some examples, so that they are available for use immediately after the preceding set of LED control signals has been applied.
  A delay-indicator that defines a period of time for the processor to wait before applying the set of LED control signals.
  A profile-direction-indicator, which defines whether the plurality of sequence numbers of the profile-data is applied in a forward or reverse direction. The processor can then determine the set of LED control signals for the LED string in accordance with light-values of the selected-profile-data for the set of sequence-numbers in either a forward or reverse direction according to the profile-direction-indicator.

One or more of the above pieces of information can enable a further still reduction in data that needs to be transmitted to the LED controller and/or data that needs to be stored in local memory in order to implement a large number of different lighting profiles.

Figure 8:
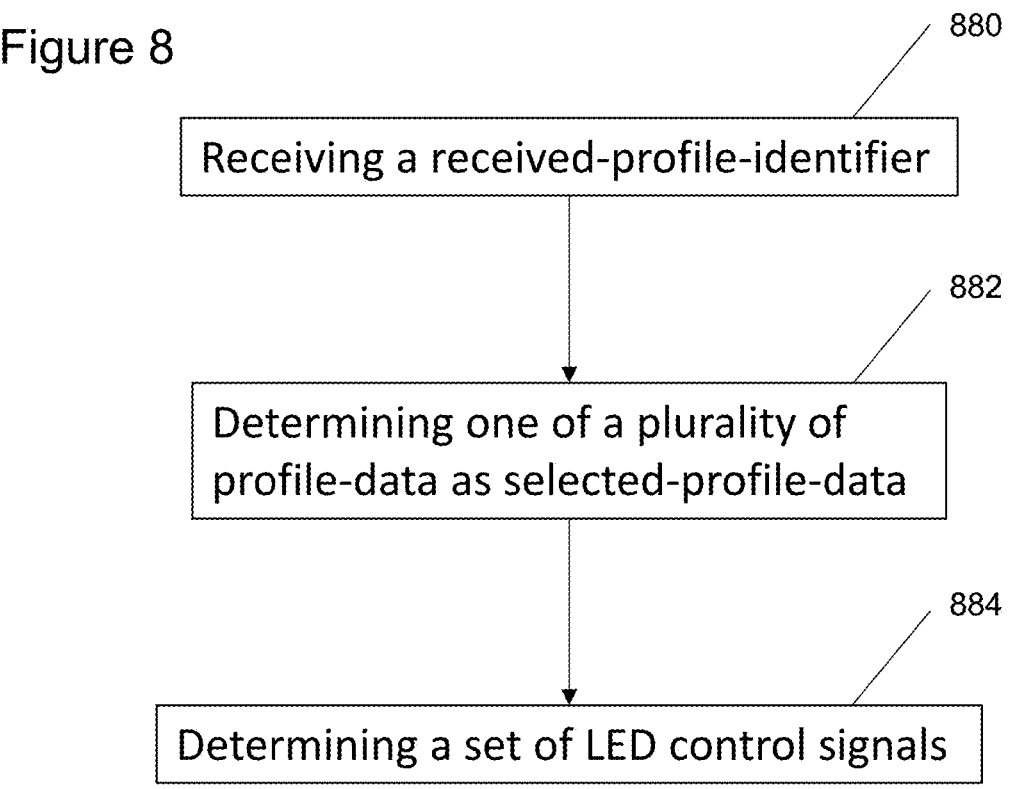
FIG. 8 illustrates an example implementation of operating an LED matrix system.

FIG. 8 illustrates a method of operating an LED matrix system. At step 880, the method comprises receiving a light-control-signal representative of at least a received-profile-identifier. At step 882, the method comprises determining one of a plurality of profile-data as selected-profile-data in accordance with the received-profile identifier. Each of the plurality of profile-data can be stored in local memory and can define an association between a plurality of light-values and a plurality of sequence-numbers. At step 884, the method includes determining a set of LED control signals for the LED string in accordance with light-values of the selected-profile-data for a set of sequence-numbers.

One or more of the examples disclosed herein can be used for automotive applications. It will be appreciated however, that the examples can also be used in other applications where large numbers of LEDs are used.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An LED controller, for connecting to an LED string, comprising:
   an input terminal configured to receive a light-control-signal representative of a received-profile-identifier;
   a local memory configured to store a plurality of profile-data, wherein each of the plurality of profile-data defines an association between a plurality of light-values and a plurality of sequence-numbers;
   a processor configured to:
      determine one of the plurality of profile-data as selected-profile-data in accordance with the received-profile identifier; and
      determine a set of LED control signals for the LED string in accordance with light-values of the selected-profile-data for a set of sequence-numbers.

2. The LED controller of claim 1 wherein the LED controller is provided on an integrated circuit, and wherein the local memory and the processor are provided on the same integrated circuit.

3. The LED controller of claim 1, wherein:
   each of the plurality of profile-data comprises coefficient values for a polynomial that defines the light-value as a function of the sequence-number; and
   the processor is configured to determine the set of LED control signals in accordance with the polynomial, the coefficient values and the set of sequence numbers.

4. The LED controller of claim 3, wherein the polynomial is up to and including a 3rd order polynomial.

5. The LED controller of claim 3, wherein the processor is configured to:
   apply the polynomial to the set of sequence-numbers, using the coefficient values represented by the selected-profile-data, in order to determine a set of associated light-values; and
   determine the set of LED control signals in accordance with the determined set of associated light-values.

6. The LED controller of claim 3, wherein:
   the set of sequence-numbers comprises a start-sequence-number and one or more subsequent-sequence-numbers, and
   the processor is configured to:
      apply the polynomial, using the coefficient values represented by the selected-profile-data, to the start-sequence-number in order to determine a start-light-value; and
      for each of the plurality of subsequent-sequence-numbers, determine a difference-light-value and add the difference-light-value to a preceding-light-value in order to determine a subsequent-light-value; and
      determine the set of LED control signals for the LED string in accordance with the start-light-value and each subsequent-light-value.

7. The LED controller of claim 6, wherein the processor is configured to apply a differentiated version of the polynomial with the coefficient values represented by the selected-profile-data to each subsequent-sequence-number in order to determine the difference-light-value.

8. The LED controller of claim 1, wherein:
   each of the plurality of profile-data comprises a plurality of light-values and their associated sequence-numbers.

9. The LED controller of claim 1, wherein the set of sequence-numbers is a subset of the plurality of the sequence-numbers of the selected-profile-data.

10. The LED controller of claim 1, wherein the light-control-signal is also representative of a profile-direction-indicator, and wherein the processor is configured to determine the set of LED control signals for the LED string in accordance with light-values of the selected-profile-data for the set of sequence-numbers in either a forward or reverse direction according to the profile-direction-indicator.

11. The LED controller of claim 1, wherein the light-control-signal is also representative of a shift-value, and wherein the processor is configured to control the speed with which the set of sequence numbers of the selected-profile-data are changed when determining the set of LED control signals in accordance with the shift-value.

12. The LED controller of claim 1, wherein the light-control-signal is also representative of an auto-indicator, and wherein the processor is configured to automatically stitch a plurality of light-change-profiles together in accordance with the auto-indicator.

13. The LED controller of claim 1, further comprising:
two output terminals for each LED in the LED string; and
a switch connected between the two output terminals for each LED, wherein the switch is configured to receive one of the set of LED control signals, such that the switch is opened and closed in accordance with the received LED control signal in order to selectively short circuit an associated LED.

14. The LED controller of claim 1, wherein the set of LED control signals comprises a set of PWM LED control signals, and wherein the processor is configured to set the width of pulses in the set of PWM LED control signals in accordance with the light-values of the selected-profile-data.

15. A method of operating an LED matrix system comprising:
receiving a light-control-signal representative of a received-profile-identifier;
determining one of a plurality of profile-data as selected-profile-data in accordance with the received-profile identifier, wherein each of the plurality of profile-data is stored in local memory and defines an association between a plurality of light-values and a plurality of sequence-numbers; and
determining a set of LED control signals for the LED string in accordance with light-values of the selected-profile-data for a set of sequence-numbers.

* * * * *